United States Patent [19]

Wahlman

[11] Patent Number: 5,450,397
[45] Date of Patent: Sep. 12, 1995

[54] METHOD FOR HANDLING REDUNDANT SWITCHING PLANES IN PACKET SWITCHES AND A PACKET SWITCH FOR CARRYING OUT THE METHOD

[75] Inventor: Jan S. R. Wahlman, Kista, Sweden

[73] Assignee: Telefonaktiebolaget LM Ericsson, Stockholm, Sweden

[21] Appl. No.: 196,487

[22] Filed: Feb. 15, 1994

[30] Foreign Application Priority Data

Feb. 15, 1993 [SE] Sweden .................. 9300484

[51] Int. Cl.$^6$ ............ H04Q 11/04; H04L 12/56
[52] U.S. Cl. .................. 370/60; 370/61; 370/94.1
[58] Field of Search ............ 370/60, 61, 62, 94.1, 370/58.1, 58.2, 58.3, 112, 17

[56] References Cited

U.S. PATENT DOCUMENTS 5,222,063 7/1993 Foglar et al. .................. 370/60

FOREIGN PATENT DOCUMENTS

0381334A2 8/1990 European Pat. Off. .
0453607A1 10/1991 European Pat. Off. .

Primary Examiner—Alpus Hsu
Assistant Examiner—Ricky Q. Ngo
Attorney, Agent, or Firm—Burns, Doane, Swecker & Mathis

[57] ABSTRACT

To provide a correct outgoing stream of data packets for each established connection (having identifying number vc/vp) in a data packet switch, which comprises several parallel switching planes, which are identical to each other, there is for each output port for each switching plane and each established connection a buffer arranged to store at least one data packet. When a first data packet arrives to an output port it is immediately tested by a control device for this output port, if this first data packet is the next data packet, which is in turn to be forwarded from the switch. In a first case, when this condition is satisfied, the data packet is forwarded from the switch. In a second case, when this condition is not satisfied, the data packet is stored in the buffer, which is arranged for the connection, to which said data packet belongs, and for the switching plane, through which the data packet has travelled.

7 Claims, 6 Drawing Sheets

METHOD FOR HANDLING REDUNDANT SWITCHING PLANES IN PACKET SWITCHES AND A PACKET SWITCH FOR CARRYING OUT THE METHOD

BACKGROUND

The present invention is related to a method for handling parallel switching planes in a packet switch and also a packet switch including such handling.

In order that a switch in a network for the transfer of data packets, for instance an ATM network, will be able to satisfy the requirement of a high reliability, some form of redundancy is required, i.e. that some parts of the hardware of the switch are made as double or multiple units, which perform exactly the same functions and operate in parallel to each other. A common way of achieving this redundancy is by means of parallel and independent switching planes.

The transfer of data packets in a packet switch may be incurred with errors, so that for instance individual data packets disappear, will be wrongly addressed or that bit errors appear in the data packet. These errors can then be detected, when the data packet is to be forwarded from the packet switch. If several switching planes are provided, the task thus is to grasp and forward, at the output port of the packet switch, only the data packets transferred without errors and also monitor that the data packets are forwarded in a correct sequential order. In packet networks and particularly ATM-networks it is, to some extent, in addition permitted that data packets are lost or discarded. For instance, the buffers necessary for the handling of the statistical multiplexing in a packet switch can be filled, whereafter data packets arriving to the buffer may be lost. Having a redundancy in the switch, for instance with parallel switching planes, this means that the same data packet in the different planes is not available at the same time at the output port of the switch, where the redundancy is terminated, that is in the connection point of the parallel switching planes. Some procedure is thus needed at the output side of such a packet switch for achieving a correct stream of forwarded packets.

The European patent application 0 381 334 discloses the handling of asynchronous, redundant digital data messages. Several parallel and equivalent communication channels are each one connected to an own buffer. The different data messages which have been received in an arbitrary order, are sorted and a majority selection is made in order to determine those channels which have correct data messages.

In the European patent application EP-A1 0 453 607 a packet switch is disclosed having redundant switching planes. For each output port from the switch there is an evaluation unit, which receives data packets from the different switching planes and in the common way selects data packets having no errors but also selects preferably or in the first place data packets from that switching plane on which the data packets are communicated most slowly. At the termination of the redundant planes it is tested if a data packet transferred on the slowest plane is the next one to be forwarded from the switch in a correct sequential order. If it is the case, the packet is forwarded, and otherwise it is cancelled by the packet next transferred being written on top of the first data packet.

SUMMARY OF THE INVENTION

It is a purpose of the invention to provide a method and a packet switch according to what has been said above having a simple and reliable handling of composing a stream of data packets forwarded from the switch from the data packets transferred to the output side of the switch and originating from different switching planes, the stream of forwarded packets resembling as closely as possible the stream of data packets arriving to the packet switch.

It is a further purpose of the invention to provide a method and a packet switch according to what has been said above permitting, in the composition of a stream of data packets forwarded from the switch, that data packets in the stream are taken from those transferred not only on a currently preferred plane but also from those transferred on other planes.

According to the invention a method and a packet switch are provided achieving the purposes mentioned. The detailed characteristics and the scope of the invention appear from the appended patent claims.

Thus generally a method is provided for achieving a correct outgoing stream of data packets for each established connection in a data packet switch, which comprises several switching planes which are identical to and parallel to each other, where the switch thus is arranged for the transfer of data packets and comprises input units or ports and output units or ports and parallel switching planes and is arranged to establish connections between input ports and output ports on the parallel switching planes, an arriving data packet being transferred in parallel, in the shape of identical copies, on the redundant planes. When a first data packet arrives to an output port, it is direct tested by control circuits in the output port, if this first data packet is the next data packet which is in turn to be forwarded from the switch. In a first case, when it is true, the data packet is transferred to an output buffer of the type FIFO ("first in-first out") in a forwarding unit in the output port of the switch in order to be forwarded from the switch. In a second case when it is not true, the data packet is stored in a buffer, which is specifically arranged for the connection, to which the data packet belongs, and for the switching plane, on which the data packet has passed. For each output port there is then for each switching plane and each established connection a buffer arranged to store or to have space for at least one data packet.

The control circuit in the output port of the switch are further advantageously arranged to test also in the first case the buffers which are arranged for the connection to which the first data packet belongs, whether they also contain the next data packet which in a correct sequential order is to be forwarded after the first data packet. In a third case, when this next data packet is present in a buffer, this next data packet is transferred to the output buffer of the forwarding unit so that also this data packet will to be forwarded from the switch.

In the third case also these buffers are advantageously tested, whether they contain the next data packet which is to be forwarded after the data packet, which has just been forwarded. If this next packet is there, this next data packet is transferred to the output buffer in the forwarding unit in order that also this data packet will to be forwarded from the switch. Further, after that in the same way the buffers are tested again and a possible next data packet is transferred to the output buffer for forwarding from the switch and this procedure is repeated until there is no more data packet in a correct sequential order present in the buffers.

The immediate testing and possible buffering of a data packet transferred on one of the identical switching planes achieves a rapid formation of the forwarded stream of data packets and also gives a correct stream when there are problems associated with the transfer of data packets on the planes, the packets e.g. not being transferred as quickly on some plane or planes as on another plane or some plane producing more errors in the packets transferred on that plane.

Further, when a data packet is transferred from one of the specific buffers to the output buffer for forwarding from the switch, also advantageously the data packet is removed from the buffer and in addition all data packets are removed from the buffer which corresponds to places in the correct sequential order of data packets which are before the place of the data packet which is forwarded.

Further, when a data packet is transferred from one of the specific buffers to the output buffer for forwarding from the switch, the data packet is advantageously removed from the buffer. In all those buffers for different switching planes which are arranged for the connection to which the first data packet belongs, further all data packets are removed, which correspond to places in the correct sequential order of data packets which agree with or are before the place of the data packet which is forwarded.

When the data packet is to be transferred to one of the specific buffers and the buffer is full, the data packet is advantageously removed or discarded, selected among this first data packet and the data packet in the buffer, which corresponds to the place in the correct sequential order of data packets for the connection, to which the first data packet belongs, which place has the highest or latest sequential order number.

BRIEF DESCRIPTION OF THE DRAWINGS

The invention will now be described with reference to the accompanying drawings, in which FIG. 1 is a schematic picture of a switch having parallel switching planes, FIG. 2a schematically illustrates the handling of a data packet at the arrival to the packet switch.

DESCRIPTION OF PREFERRED EMBODIMENTS

Figures 1, 2A:
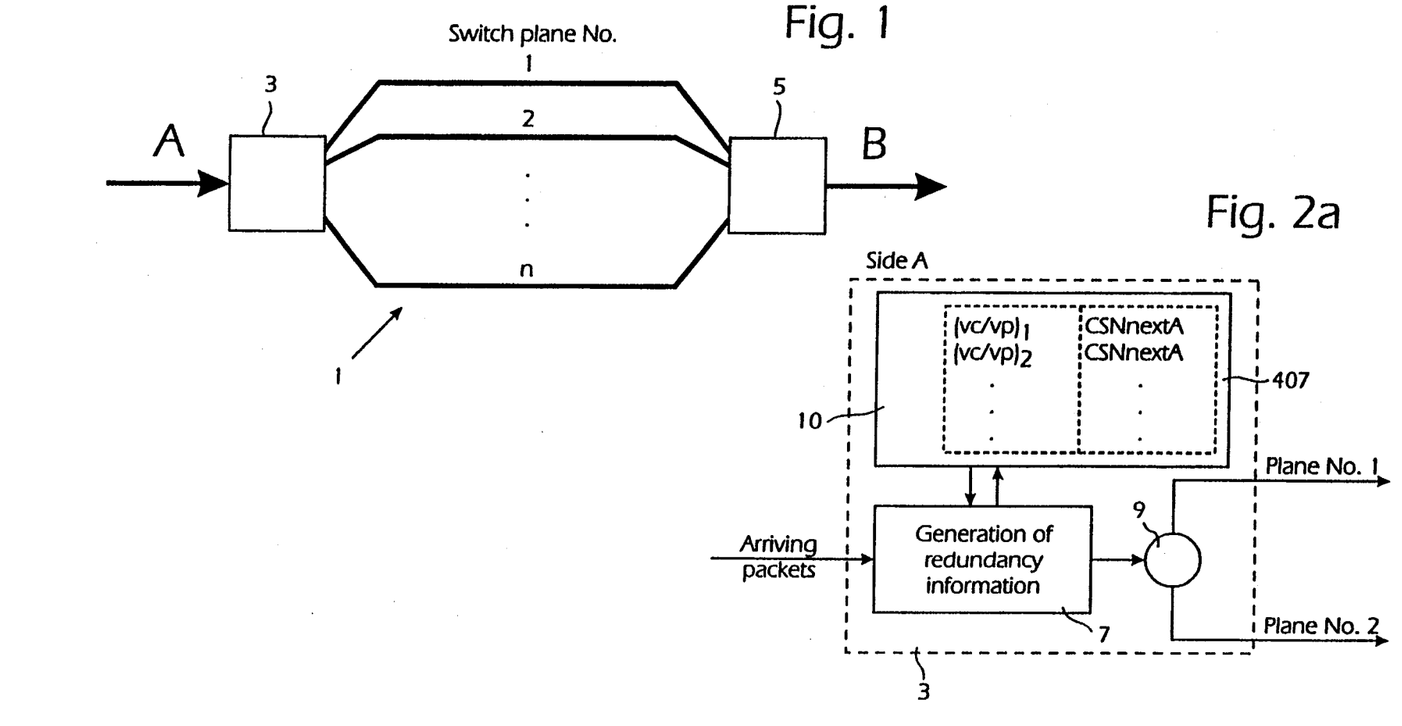

In FIG. 1 the construction of a packet switch 1 is schematically illustrated. The switch unit 1 comprises inputs on a side A which are here represented by an input port or unit 3 and a number of outputs on a side B which are here represented by an output port or unit 5. The input unit 3 and the output unit 5 are connectable by means of the logic of the packet switch, that is the logical circuits inside the switch core, wherein electrical connections or links are established in parallel on the n multiple switching planes. A data packet which arrives to side A and thus to the input unit 3, generates n identical data packets. They are transmitted on the n switching planes, where the transfer of these identical data packets are performed completely independently on the different switching planes. These identical data packets then arrive to the output unit 5 and therein correctly transferred data packets are selected and a sequence of outgoing data packets is achieved having a correct sequential order of the different data packets. In the output unit 5 thus in some way only one of the identical data packets is selected which correspond to an incoming data packet which has previously arrived to the input unit 3.

Each data packet is assumed to belong to a logic connection, which is established through the whole network and in particular through each switch 1, when initially a request of transfer of information is received from a terminal (not shown) in a network (not shown) where the switch 1 is connected.

Figure 2B:
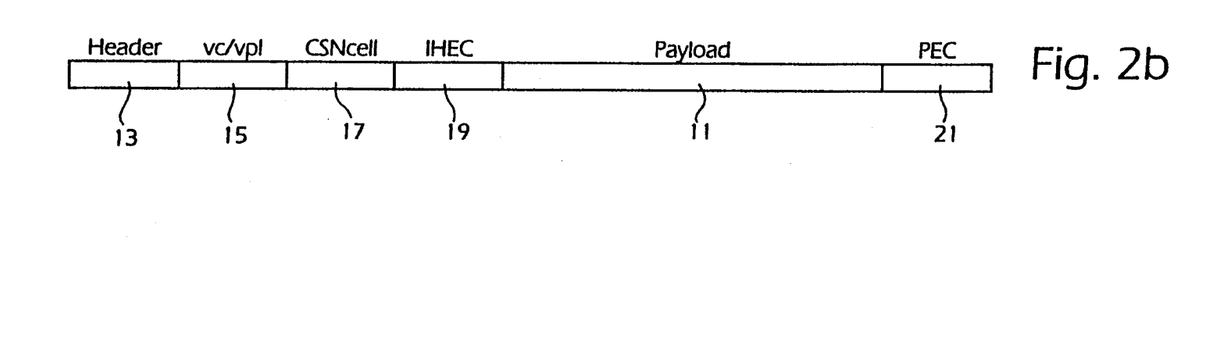
FIG. 2b illustrates a data packet as forwarded on a switching plane from an input unit, FIG. 3 schematically illustrates the handling of a data packet which has been transmitted through the packet switch and which is to be forwarded therefrom.

For the FIGS. 2a–b and in the following of this description it is assumed that the packet switch contains two switching planes, a switching plane No. 1 and a switching plane No. 2. In FIG. 2a is illustrated how data packets are processed on the input side, i.e. after the arrival to the input unit 3, before the data packets are transmitted on the switching planes. In a block 7 particular information is generated, redundance information or administrative information, and is added to or inserted in the data packet, before it, through a transmitting node 9, is forwarded as two identical copies on the two switching planes. In FIG. 2b the configuration of a data packet is illustrated after the passage through the block 7. The data packet thus comprises the real or proper information as sent by the terminal (not shown) from which the request of transmitting information was originally made, which information thus is to be transferred and which is located in a field 11, which here is called "Payload". In addition the proper data packet can contain a leading field 13, here called "Header", which can contain both general and other administrative information relating to the data packet, such as a destination address, an origin address, i.e. the network address of the source terminal (not shown), information relating to priority, channel number, etc.

In the block 7, for generating the extra information for the transmission of the data packet inside the switch 1, a field 15 is inserted in the data packet containing an internal connection number "vc/vp" and a field 17 containing a sequential number, "CSNcell". Two check sums, "IHEC"="Internal Header Error Check" and "PEC"="Payload Error check" are inserted in fields 19 and 21 respectively in the complete data packet. The first check sum "IHEC" in the field 19 is thus in particular related to the information in the various administrative fields 13, 15, 17 in the completed data packet, while the check sum "PEC" in the second field 21 relates in particular to the proper information content of the data packet, "Payload", in the field 11. The internal connection number "vc/vp" is formed by means of information relating to the logic connection, to which the data packet belongs, and is unique for each such logic connection. The sequential number "CSNcell" in the field 17 is taken from a list 407 in a memory 10 indicating the next number for the logical connection to which the data packet belongs, and in some simple way indicates the sequential number of the data packet in the sequence of data packets which is transferred on the established logic connection. For instance the first data packet to be sent on a logical connection is given the sequential number 1, the second one the sequential number 2, etc. Due to the generally limited length of the field 17 for the sequential number "CSNcell" and since often a very large number of packets is transferred for each established connection, an increasing sequence of sequential numbers will at last achieve the highest number which can be represented in the field 17, and then the sequential numbers are restarted. The sequential numbers "CSNcell" for a connection will thus return cyclically or modulo the highest number which can be represented by the bits in the field 17. In the following such an increasing consecutive numbering modulo some number is assumed to be valid for the sequential numbers "CSNcell".

Figure 3:
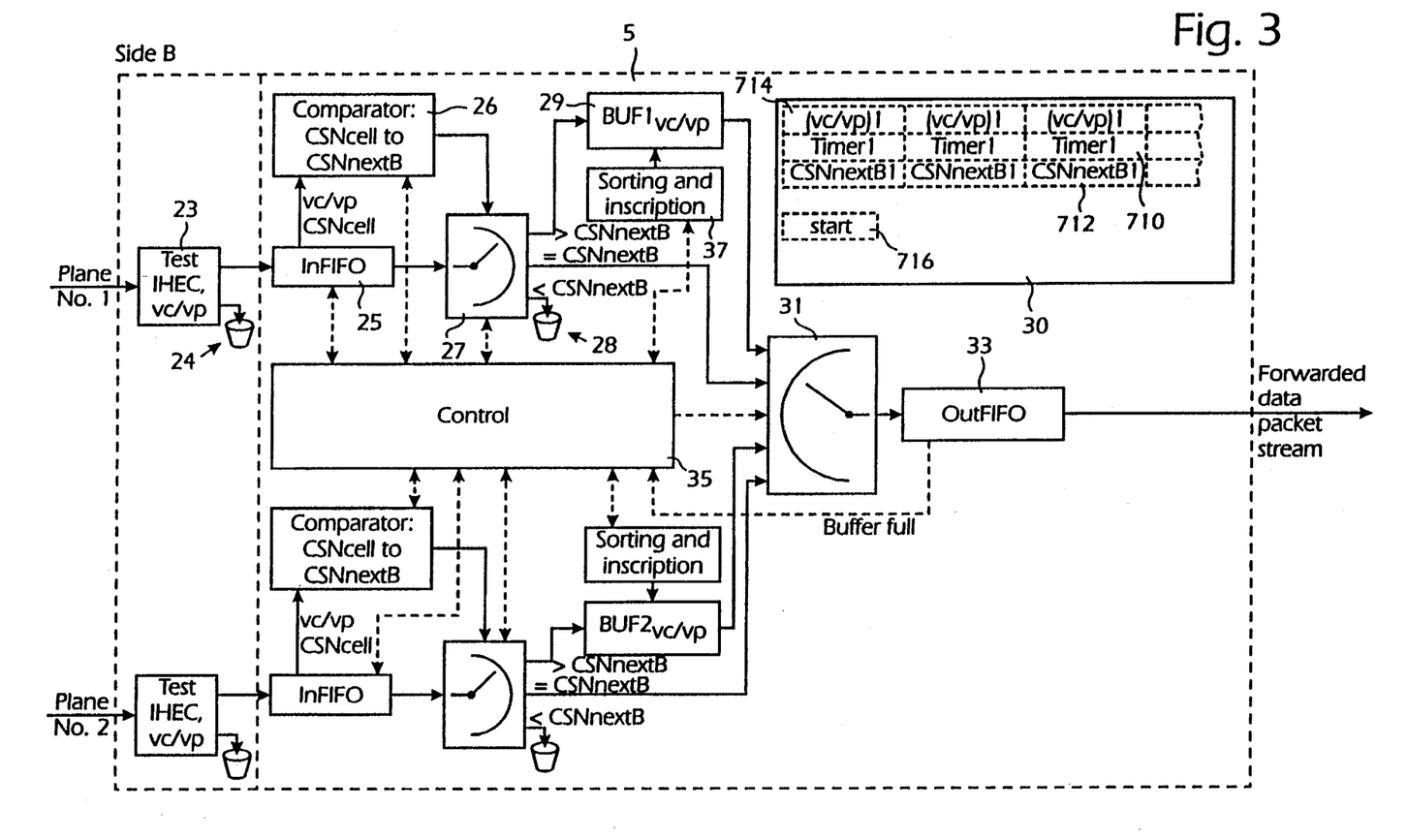

In FIG. 3 the handling on the output side or side B of the switch 1 is schematically illustrated, when data packets arrive from two switching planes having numbers 1 and 2. When a data packet has passed through a switching plane and arrives to the output unit 5, it is received by and first checked in a checking unit 23, whether the first check sum "IHEC" relating to the administrative information of the data packet is correct. If this check sum "IHEC" is not correct, the data packet is discarded as is indicated at 24, while it otherwise is transferred to a first FIFO register or InFIFO 25 associated with the switching plane on which the data packet was transferred through the switch 1. Such a first FIFO register 25 is thus arranged for each switching plane at the termination of the redundant switching planes in the output unit 5.

Directly, when an arrived data packet is stored in an InFIFO register 25, it is decided, whether the data packet is to be discarded, possibly is to be forwarded as the next packet in the sequence of data packets forwarded from the output unit 5 and the switch 1 or is to be saved in a buffer $BUF1_{vc/vp}$ or $BUF2_{vc/vp}$ 29. Such a buffer $BUFm_{vc/vp}$ 29 is arranged for each established logic or internal connection, the number of which is determined by the contents "vc/vp" of the field 15, cf. FIG. 2b, and for each switching plane No. 1 and 2 (m=1 or 2).

When a data packet is intermediately stored in a InFIFO register 25 the immediate handling of the packet is thus decided by a comparator unit indicated at 26. The comparator unit 26 extracts through a connection line the connection number "vc/vp" and the sequential number "CSNcell" of the data packet from the InFIFO 25 and a sequential number "CSNnextB", associated with the connection number "vc/vp" and stored in a register 712 in a memory 30 in the output unit 5. This memory 30 also contains other variables which will be discussed below. The sequential number "CSNnextB" stored in the memory 30 corresponds to the sequential number of the next data packet which, in a correct sequential order for the connection indicated by the connection number "vc/vp" of the data packet stored in the InFIFO 25, is to be forwarded from the output unit 5 in the switch 1.

If the result of the comparison made by the comparator unit 26 is that the sequential number "CSNcell" in the field 17 of the data packet stored in the InFIFO agrees with the sequentially next number "CSNnextB", the comparator 26 provides a signal to a selection device 27 for transferring the data packet to a second FIFO register, OutFIFO 33 to be forwarded from the output unit 5 in the switch 1.

If the result of the comparison made by the comparator 26 is that the sequential number "CSNcell" of the considered data packet is smaller than this current sequential number "CSNnextB" or considering the fact that these sequential numbers follow with a cyclical repetition, if the sequential number "CSNcell" of the data packet generally corresponds to an earlier sequential number, the data packet is already "old" and is therefore discarded, which is indicated at 28. The discarding procedure may be executed by arranging that the comparator unit 26 sends a signal on a line (not shown) to the InFIFO register 25 for resetting the register but this case is not illustrated in the drawing.

If instead the result of the comparison it that the sequential number "CSNcell" of the stored data packet is larger than the current sequential number "CSNnextB" or generally corresponds to a data packet after this sequential number considering the cyclical repetition, the selection device 27 is fed with an appropriate signal for transferring or saving the data packet in the buffer $BUFm_{vc/vp}$ 29 arranged for the connection of the considered data packet and switching plane, however, with the condition that generally the sequential number "CSNcell" of a data packet to be stored in the buffer register 29 is not allowed to exceed the current sequential number "CSNnextB" by an amount which is too large. It is determined by a predetermined number w, which defines a suitable window size. If the sequential number "CSNcell" of the intermediately stored data packet thus is larger than the current sequential number "CSNnextB" for the connection of the data packet and at the same time smaller than the same number increased by w, i.e. "CSNnextB+w", the data packet is thus saved in the buffer $BUFm_{vc/vp}$ 29 for the connection of the considered packet and the plane (m=1 or 2) on which the data packet has been transferred.

A switching circuit or multiplexer 31 then selects the next data packet which is to be forwarded from the switch 1 and therefore is first transferred to the second FIFO register OutFIFO 33, by selecting among data packets which partly are present in the first FIFO InFIFO registers 25, partly in the buffers $BUFm_{vc/vp}$ 29 for the two switching planes corresponding to the current connection. From the second FIFO register OutFIFO 33 then the data packets are forwarded from the switch 1. In the choice which is performed by the switching circuit 31, thus always a suitable data packet is taken, such that the data packets forwarded from the switch 1 for each connection will be in a correct sequential order, as indicated by the internal sequential number "CSNcell", and such that the forwarded sequence of data packets will be optimal in relation to loss of data packets and possible errors of the check sum "PEC" relating to the proper content of the data packet, "Payload", in the field 11. Further, in the FIFO register 33 at the output side, the extra information is removed which has been added to the data packet in the transmission thereof inside the switch, i.e. the fields 15, 17, 19 and 21 as illustrated in FIG. 2b, which contain internal connection number, internal sequential number, check sum relating to the administrative information and check sum relating to the proper content of the data packet.

Figure 4:
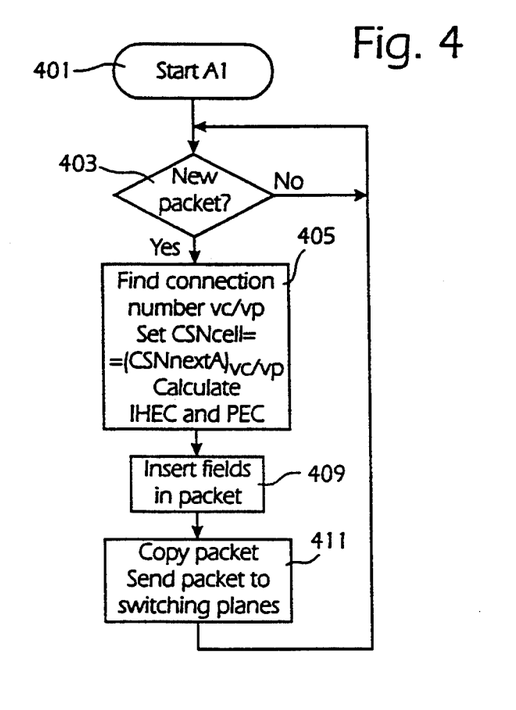
FIG. 4 shows a flow diagram illustrating the handling of a data packet at the arrival thereof to a packet switch.

In FIG. 4 a flow diagram is shown for the handling of data packets in the input unit 3 of the switch 1. The diagram starts in a block 401 and after that in a block 403 it is decided, if a new data packet has arrived. If it is not the case, the block 403 is repeated again and again, until a data packet has arrived to the input unit 3. Then the extra internal information is generated which is necessary for the simultaneous transmission of the data packet 21 on the multitude of redundancy planes, as is indicated at 7 in FIG. 2a and in a block 405 in FIG. 4. It means, as has been indicated above, that the logical connection to which the data packet belongs is determined and the corresponding internal connection number "vc/vp" is found or generated, that the internal sequential number "CSNcell" of the data packet is set equal to the next current sequential number "CSNnextA" for this connection which is taken from a field associated with this connection in the list or table 407 (FIG. 2a). After that the contents "CSNnextA" in the field in the list 407 is increased to the number of the next data packet, i.e. in the case treated here generally increased by the number 1 and considering that the sequence order of the sequential numbers is modulo some number. At last in the block 405 the check sums "IHEC" and "PEC" are calculated, as has been indicated above.

In a block 409 then these new fields are inserted in the data packet. In a block 411 the data packet modified hereby is copied, transferred to suitable registers (not shown, associated with the node 9) for the different switching planes and are transmitted on these. The routine is then terminated and the program flow returns to the block 403 to decide if any new data packet has arrived to side A.

Figure 5:
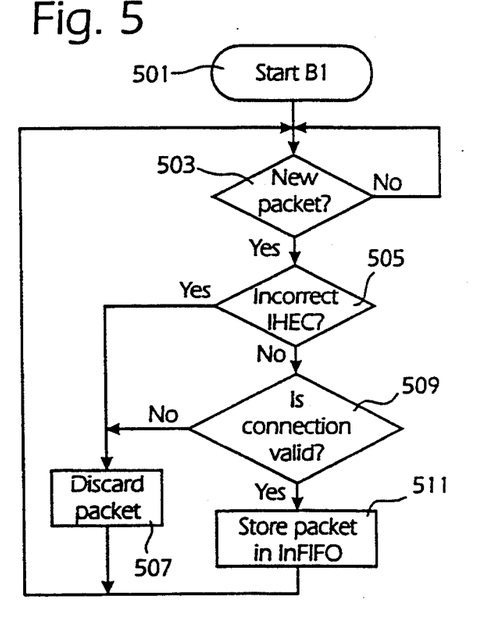
FIG. 5 shows a flow diagram of the storing of a data packet in an incoming register at the output side of a packet switch, FIG. 6 schematically illustrates the formation of a sequence of data packets forwarded from the packet switch.

In FIG. 5 is illustrated, also by means of a flow diagram, the procedure performed by the receiving and checking unit at 23 at the output side or side B, i.e. in the output unit 5, when a data packet has passed through a switching plane. The procedure starts in a block 501, after which it is decided in a block 503, if any new data packet has arrived. If it is not the case, as above the same decision is made again and again, until a new data packet has arrived. When at last a new data packet has arrived, it is decided in a block 505, if the check sum "IHEC" relating to the administrative information in the data packet is incorrect. If it is the case, the data packet is discarded in a block 507, compare 24 in FIG. 3, after which it is decided in the block 503 again, if any new data packet has arrived.

If the check sum "IHEC" is found to be correct in the block 505, it is decided in a block 509, whether the connection to which the data packet belongs is established. It is made by checking the internal connection number "vc/vp" of the data packet in the field 15 thereof, see FIG. 2, to a table or list of fields 714 in the memory 30 (see FIG. 3) of the internal connection numbers "(vc/vp)$_1$", "(vc/vp)$_2$", . . . of the currently existing or established logical connections. If it is decided in the block 509, that the connection is established, in a block 511 the data packet is transferred to or saved in the InFIFO register 25 of this switching plane, cf. FIG. 3, and then it is decided in the block 503 again, if any new data packet has arrived. If it is decided in the block 509, that the connection is not established, the program flow continues to the block 507, where the data packet is discarded, compare 24 in FIG. 3, after which the program flow as above continues to the block 503 in order to decide, if any new data packet has arrived.

Figure 6:
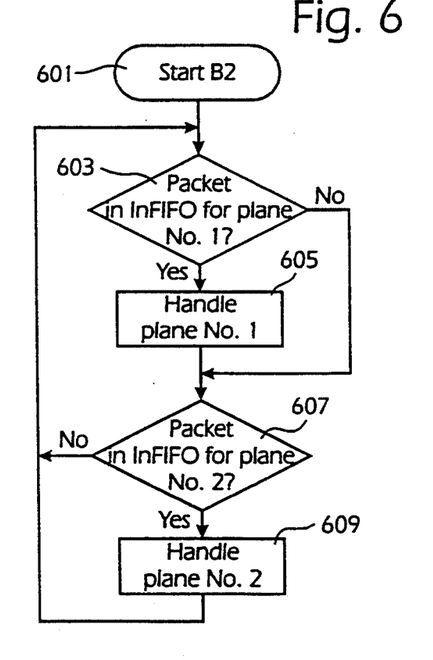

In FIG. 6 a flow diagram is shown illustrating the handling of data packets when they are stored in the first, incoming FIFO registers InFIFO 25, as performed globally at the output side by a control device 35. The control device 35, e.g. a signal processor, thus controls the handling of data packets already present in the In-FIFO registers 25 and the operation of the comparator devices 26, the selection devices 27, the multiplexer 31 and the OutFIFO register 33 as indicated in FIG. 3. For the control the control device 35 also reads various information and data fields in the connected devices and in the memory 30 where it also continuously updates the information stored.

The procedure is illustrated as above for two switching planes. The procedure starts in a block 601, after which it is decided in a block 603, if there is any packet stored in the incoming register InFIFO 25 for switching plane No. 1. If it is decided to be the case, in a block 605 a handling routine is executed for plane 1, which will be described in more detail hereinafter with reference to FIG. 7. When the handling routine of the block 605 is terminated, it is decided in a block 607, if any data packet is present in the incoming register InFIFO 25 for the second switching plane or plane No. 2. If it is the case, in a block 609, in the corresponding way as for the block 605, a handling routine is performed for the switching plane 2. This handling routine is analogous to the handling routine performed in the block 605 and will therefore not be described. After this the program flow restarts and continues to the block 603 to decide, if any data packet is stored in the InFIFO register 25 for the first switching plane.

If it was decided or determined in the block 603, that there is no data packet in the InFIFO register 25 for the first switching plane, the program flow continues to the corresponding decision for plane 2 in the block 607. If it is decided in this block, that no more data packet is present in the incoming FIFO register 25 for the latter switching plane, the program flow continues again to block 603 to question if any data packet has arrived to the register InFIFO 25 for the first switching plane.

In the procedure illustrated in FIG. 6, plane 1 is the preferred switching plane. If this plane proves to have worse transferring characteristics than the plane 2, data packets should instead in the first place be taken from plane 2. Particular procedures exist therefor but are not shown here.

Figure 7:
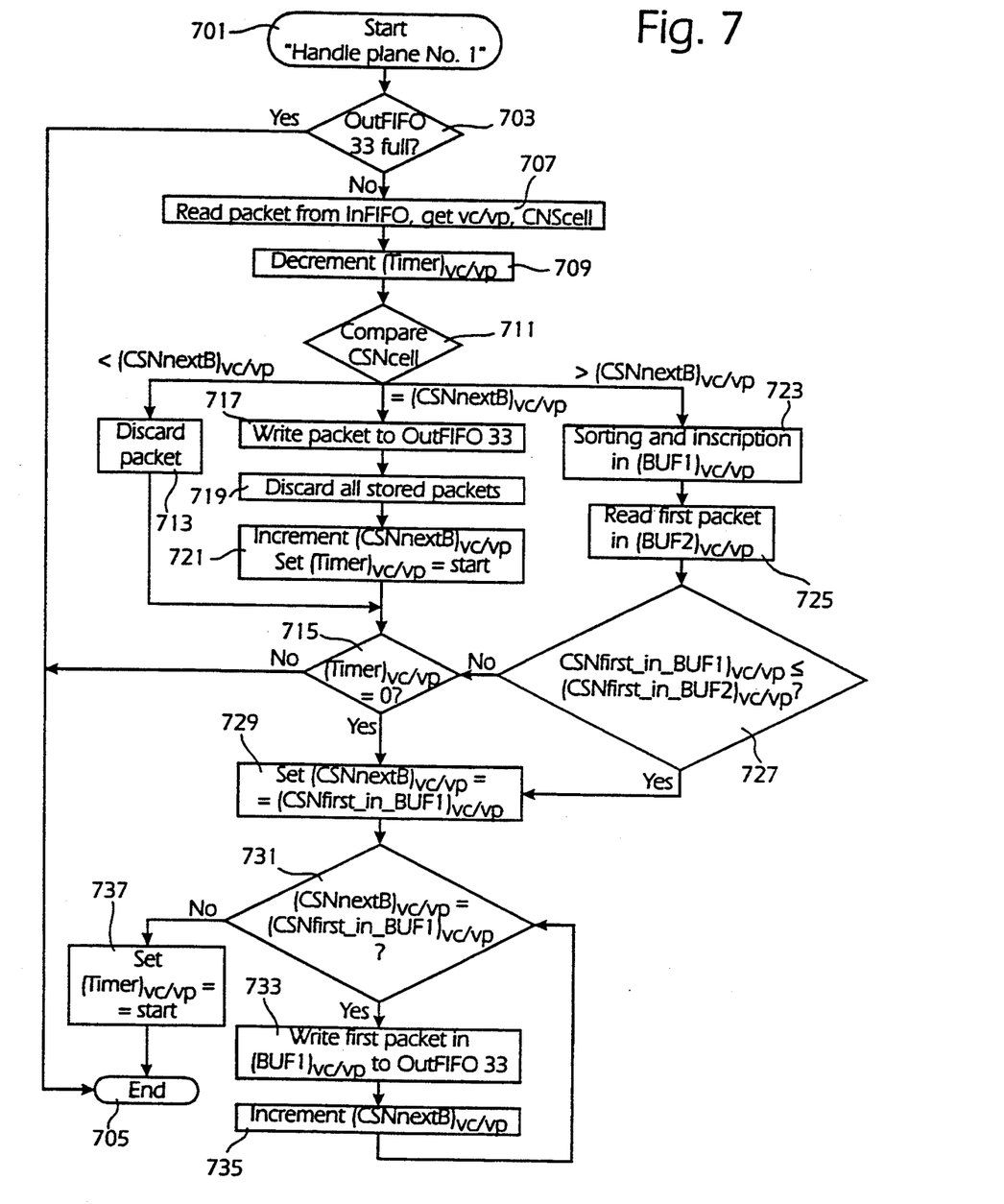
FIG. 7 shows a flow diagram of the handling procedure of a switching plane at the output side of the packet switch and the incoming register of the switching plane at the output side.

In FIG. 7 the handling routine is shown, to which the program flow continues in the block 605 in FIG. 6 and which comprises the steps, executed by the comparator 26 and the selection device 27 for switching plane No. 1 in FIG. 3, in order to perform the logical choices for for instance buffering in a buffer 29 before the choice of a correct data packet in the multiplexer 31 in FIG. 3. In FIG. 7 the program flow is illustrated only for switching plane 1, but the same procedure is performed fop other switching planes.

The handling routine starts in a block 701, after which it is decided in a block 703, if the second FIFO register, OutFIFO 33 at the output side is full. If it is the case, naturally no more data packets can be chosen and nothing more be done and the next step is that the handling routine is terminated in a block 705.

If it was instead decided in the block 703, that the register OutFIFO 33 is not full, the data packet is in a block 703 read from the InFIFO register 25, i.e. the incoming FIFO register at the output side, for switching plane 1. In particular the internal connection number "vc/vp" and the sequential number "CSNcell" of the data packet are accessed and provided to the comparator 26. After this in a block 703 a timer 710 in the memory 30 (see FIG. 3) or clock is decreased by one step, which has been set to a start value, called "start" and stored in a data field 716 in the memory 30, at the establishment of the connection to which the considered data packet belongs. There is thus a timer field 710 in the memory 30 for each logical connection passing through this output unit 5.

In the next block 711 (in the comparator 26) the sequential number "CSNcell" of the data packet is compared to the current sequential number "CSNnextB" for the connection of the packet in order to decide if the data packet is to be discarded, compare 28 in FIG. 3, possibly is to be buffered in $BUF1_{vc/vp}$ or directly transferred to the outgoing OutFIFO register 33. If thus the sequential number "CSNcell" of the data packet is smaller than the current sequential number or next sequential number "CSNnextB", which is stored in a table field or register 712 in the memory 30 (see FIG. 3) for the connection which is indicated by the connection number "vc/vp" of the data packet, the data packet is too "old" and is thus discarded in a block 713 (28 in FIG. 3). After that it is decided in a block 715 if the timer 712, which has been earlier decremented in the block 709, has run out, i.e. is equal to zero. If it is not the case, the handling procedure is terminated for this switching plane in the block 705 and the next handling step is found in the flow diagram of FIG. 6.

If it is instead decided in the block 711 that the sequential number "CSNcell" of the data packet is equal to the current or next number "CSNnextB" stored in the data field 712 (FIG. 3) for data packets on the connection to which the data packet belongs, the data packet is directly transferred, as indicated in a block 717, to the outgoing FIFO register 33 by a suitable control of the selection device 27 and the multiplexer 31. Since data packets which are communicated on a considered switching plane, always arrive in a correct sequential order to the output side, all data packets already stored in the buffer $BUF1_{vc/vp}$ 29 must have a lower sequential number or generally correspond to earlier data packets than the considered data packet. Therefore in the next block 719 all data packets in the buffer $BUF1_{vc/vp}$ 29 for this connection and for this switching plane are discarded. Then the current sequential number "CSNnextB" for this connection is incremented to the next sequential number, i.e. generally increased by one in a cyclic order, in a block 721 and stored in the appropriate data field 712 in the memory 30. Here also the earlier mentioned timer 710 for the connection of the processed data packet is restarted. Its value is set to the predetermined value "start" and it is stored in the field 710 in the memory 30. Then the block 715 is performed, as has been described earlier.

If it was decided in the block 711, that the current or expected next sequential number "CSNnextB" for the connection, to which the data packet belongs, is smaller or lower (=corresponds to an earlier packet) than the internal sequential number "CSNcell" of the data packet a subroutine is executed in a block 723, as indicated by a device 37 for sorting and inscription of data packets in the buffer 29 $BUF1_{vc/vp}$ in FIG. 3. The sorting and inscription routine is illustrated in more detail by two alternative flow diagrams in FIGS. 8 and 9, which will be described more in detail hereinafter.

After the handling routine of block 723 has been executed, in a block 725 the first data packet is read or generally the data packet having the earliest sequential number, which is stored in the corresponding buffer $BUF2_{vc/vp}$ of the next switching plane, i.e. in the considered case the second switching plane, for this connection. In particular its sequential number "CSNfirst—in—$BUF2_{vc/vp}$" is accessed. In a block 727 then this sequential number "CSNfirst—in—$BUF2_{vc/vp}$" is compared to the corresponding entity for switching plane No. 1, that is "CSNfirst—in—$BUF1_{vc/vp}$" or the sequential number of the data packet stored in the buffer 29 for switching plane 1, which has the earliest or first sequential number in this buffer.

In the described case switching plane No. 1 is the preferred switching plane for selecting data packets in the multiplexer 31 in FIG. 3 and therefore in the block 727 it is decided, if the data packet with the lowest or first sequential number "CSNfirst—in—$BUF1_{vc/vp}$" in the buffer 29 for this connection and switching plane No. 1 is lower than (corresponds to an earlier packet) or is equal to the lowest or earliest sequential number "CSNfirst—in—$BUF2_{vc/vp}$" for a data packet in the buffer "$BUF2_{vc/vp}$" for this connection and for switching plane No. 2. If it is not the case, then the block 715 is performed as above.

A method for choosing a switching plane preferred at each instant and a packet switch for carrying out the method is described in the simultaneous patent application having the title "A method for handling redundant switching planes in packet switches and a packet switch for carrying out the method and a switch for carrying out the method", corresponding to the Swedish patent application SE A 9300485-1, filed 15 Feb. 1993 in the name of Ellemtel Utvecklings AB, which is incorporated herein as a reference.

If it is decided instead in the block 727, that the lowest sequential number "CSNfirst—in—$BUF1_{vc/vp}$" for a data packet in the buffer "$BUF1_{vc/vp}$" for switching plane No. 1 is higher than (=corresponds to a later data packet) the lowest sequential number "CSNfirst—in—$BUF2_{vc/vp}$" for a data packet in the buffer 20 for switching plane 2, in a block 729 which has also been performed when the earlier set timer "Timer" for this connection has been decided to have run out in the block 715, the current sequential number "CSNnextB", i.e. the next sequential number, for a data packet on this connection, is set equal to the lowest sequential number "CSNfirst—in—$BUF1_{vc/vp}$" for data packets in the buffer "$BUF1_{vc/vp}$" for this connection and for switching plane No. 1. In these cases data packets in the sequence of packets on this connection must have been lost, in one case because only data packets further on in the sequential number order have arrived to the end buffers 25 of the two switching planes and in the other case because the next data packet in the sequence has not arrived correctly to any one of the final steps 25 of the switching planes within a reasonable time indicated by the timer "Timer" in the stored data field 710. Therefore the sequential number pointer ΘCSNnextB" must be advanced in these cases.

Since the sequential order now has been broken and the pointer "CSNnextB" to the next or expected sequential number has been advanced, data packets can be fed from the buffer "BUF1$_{vc/vp}$" for this switching plane. Therefore it is decided in a block 703 whether the current sequential number "CSNnextB" for data packets belonging to this connection is equal to the lowest or earliest sequential number "CSNfirst_in_BUF1$_{vc/vp}$" for data packets stored in the buffer 29 of this connection and for the considered first switching plane. If equality is true, which thus is always satisfied the first time when the program flow arrives to this step, this data packet having the lowest sequential number "CSNfirst_in_BUF1$_{vc/vp}$" is transferred to the outgoing OutFIFO register 33 and the data packet is hereby removed from the buffer 29. After this the current sequential number "CSNnextB" of this connection is increased one step in a block 735 to indicate the next data packet expected in the sequence. Then the block 731 is performed again, where it is thus decided if there are further data packets in this buffer. If it is not the case, a block 737 is performed, wherein the timer "Timer" stored in the data field 710 in the memory 30 is restarted and again set to its start value "start". Then the routine is finished and terminated in the block 705.

Figure 8:
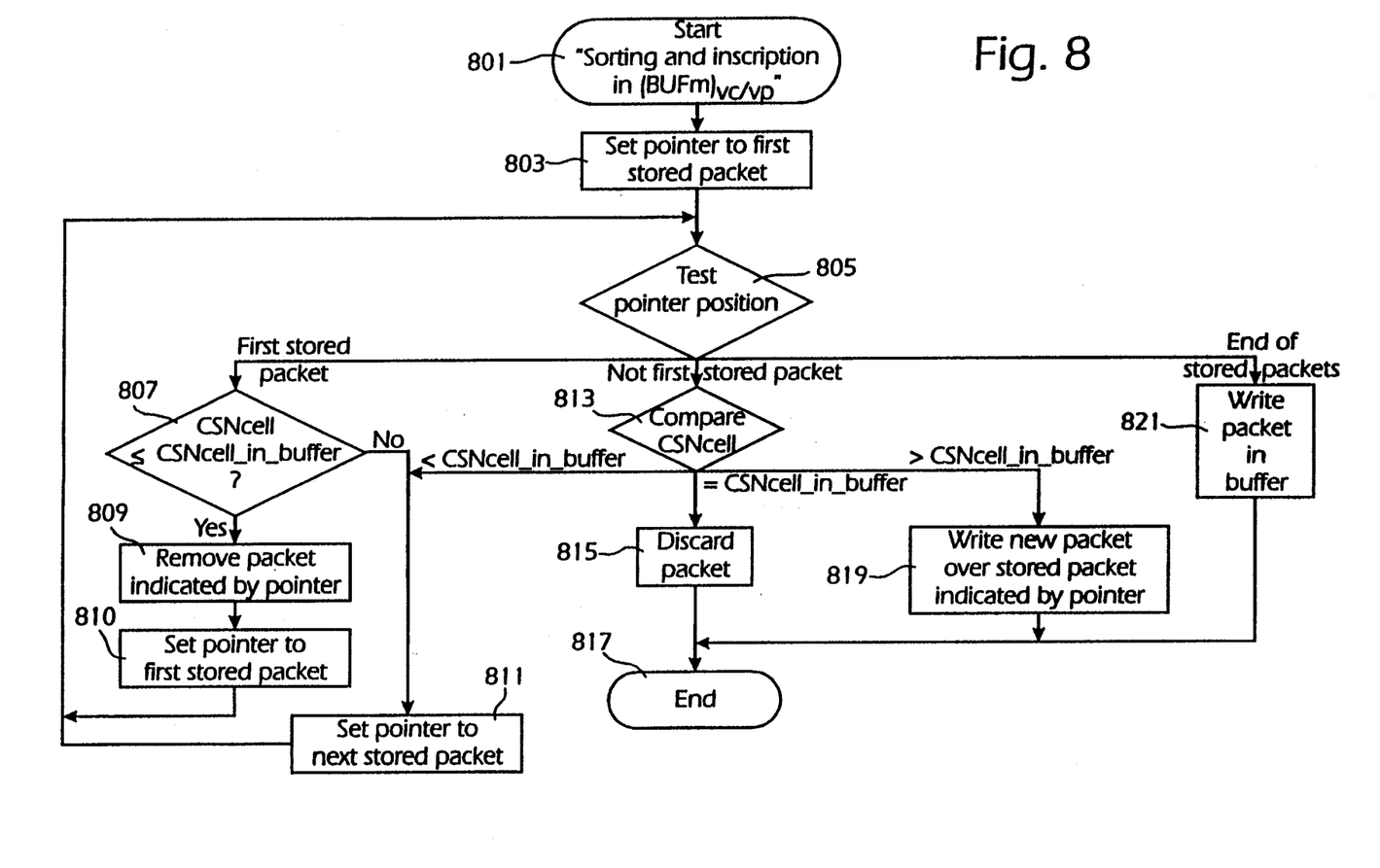
FIGS. 8 and 9 show flow diagrams in two alternative procedures for the storing of data packets in a connection buffer at the output side of a packet switch.

In FIG. 8 a flow diagram is shown of a first alternative of the procedural steps for sorting and inscription of a data packet in the buffer "BUFm$_{vc/vp}$" for one of the switching planes, m=1 or 2, being performed in subroutines corresponding to the block 723 in FIG. 7 and by the sorting and inscription devices 37 in FIG. 3. The procedure starts in a step 801 and in the next step 803 a pointer is set to the first packet in the buffer, i.e. to the data packet which has the lowest or earliest sequential number "CSNfirst_in_BUF1$_{vc/vp}$". If there is no packet stored in the buffer, the pointer is set to a suitable value to indicate this state. After that different measures are performed and a selection or a comparison in the block 805 depending on the position of the data packet which the pointer indicates.

If thus the pointer indicates that there are cells stored and then points to the first cell, i.e. the data packet having the lowest sequential number "CSNfirst_in_BUF1$_{vc/vp}$" which thus among other situations will be true the first time at the start of the procedure, a comparison is performed in a block 807 of the sequential number "CSNcell" of the considered, just arrived data packet to the sequential number "CSNcell_in_buffer" of the data packet in the buffer, which the pointer indicates. If the sequential number "CSNcell" of the data packet is decided to be equal to or lower (corresponds to an earlier packet) than the sequential number "CSNcell—in—buffer" of the data packet, to which the pointer points, i.e. generally in the start of this procedure the first data packet in the buffer, in a block 809 this data packet is removed, which the pointer indicates. Hereby another data packet if there are any more in the buffer, will of course be the first data packet, i.e. the data packet which has the lowest or earliest sequential number in the buffer. After this the pointer is set in a block 810 such that it is made to point to this next data packet in the buffer, which now is the first one, if there are any more data packets stored in the buffer, and otherwise the value of the pointer is set, so that the pointer signals the end of the stored packets, i.e. that there are no packets stored. After the block 810 the comparison in the block 805 is performed again in the same way which has been described above.

If it was decided instead in the block 807, that the condition was not satisfied, i.e. for the case that the sequential number "CSNcell" of the considered data packet is higher (corresponds to a later packet) than the sequential number "CSNcell_in_buffer" of the data packet to which the pointer points, in a block 811 the pointer is stepped to indicate the next cell stored in the buffer or is set to a suitable value to indicate the end of stored packets.

If it was decided in the block 805 that the pointer points to a data packet in the buffer, which is not the first data packet, i.e. not to the data packet having the lowest sequential number "CSNfirst_in_BUF1$_{vc/vp}$" in the buffer, in a block 813 a comparison is performed of the sequential number "CSNcell" of the arrived data packet to the sequential number "CSNcell_in_buffer" of the data packet, to which the pointer points. If it thus is decided, that the sequential number "CSNcell" of the arrived data packet is higher (corresponds to a later packet) than the sequential number "CSNcell in buffer" of the data packet in the buffer, to which the pointer points, then the block 811 is performed as above.

If it is decided instead, that the sequential numbers "CSNcell" and "CSNcell_in_buffer" coincide, the current data packet having sequential number "CSNcell" is discarded in a block 815, since some error then must be present, and then the procedure is terminated in an end block 817. If it in the block 813 instead proved, that the sequential number "CSNcell" of the considered data packet was lower (corresponds to an earlier packet) than the sequential number "CSNcell_in_buffer" of the data packet to which the pointer points, in a block 819 the current data packet is inserted in the buffer 29 and is made to replace exactly the data packet to which the pointer points. The packet earlier stored in the buffer must then obviously be incorrect owing to the fact that data cells always arrive in a correct sequential order in the transmission on each individual switching plane. After that the procedure is terminated in the block 817.

If it in the earlier comparison 805 was decided, that the pointer indicates a place in the buffer which is not filled, i.e. that the procedure has arrived to the end of the list of data packets in the buffer, in a block 821 the current data packet having the sequential number "CSNcell" is transferred to the buffer 29 to a place in the buffer after the last cell earlier stored in the buffer. After this the procedure is terminated and continues to the block 817.

Figure 9:
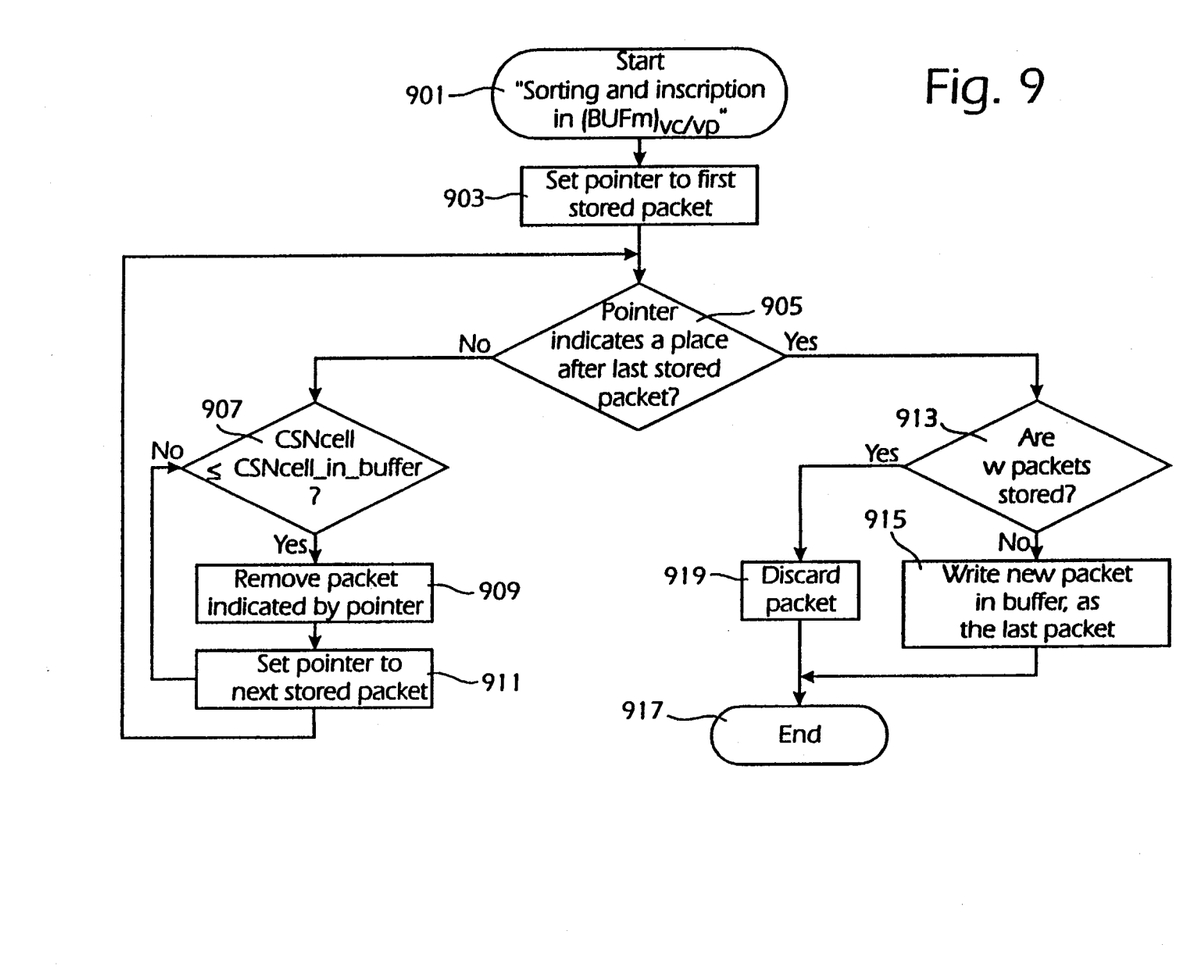

In FIG. 9 a somewhat simpler embodiment of the sorting and inscription routine in the buffer "BUFm$_{vc/vp}$" 29 is shown. The procedure starts as earlier in a block 901 and continues directly to a block 903, wherein a pointer is set to indicate the first packet stored in the buffer or alternatively a value telling that there are no more packets in the buffer if it is true. Then the pointer is tested in a block 905 if it indicates that no more packet or packets are stored in the buffer.

If it is decided in this block 905, that there are more packets stored in the buffer, it is tested in a block 907 if the current arriving data packet has a sequential number "CSNcell" lower than (corresponds to an earlier packet) or is equal to the sequential number "CSNcell_in_buffer" of the stored data packet to which the pointer points. If it is the case, the packet to which the pointer points must be incorrect because of the sequential correctness in the transmission of packets on each individual switching plane. Therefore in a block 909 the data packet stored in the buffer is discarded, to which the pointer points. Then in a block the pointer is changed, such that it points to the next packet stored in the buffer or so that it possibly indicates that there are no more packets stored. After that the procedure continues again to the block 905 to test the pointer.

If it instead was decided in the block 907 that the arriving data cell has a sequential number "CSNcell" higher than (corresponds to a later packet) the sequential number of the stored cell, to which the pointer points, the procedure directly continues to the block 911 to step or change the pointer respectively.

If it instead is decided in the block 905, that the pointer signals that there are no more packets stored in the buffer, it is decided in a block 913, if a number of w packets are already stored. If it is not the case, there is space left in the buffer 29 and the incoming packet is stored in the buffer last in the line of earlier arrived packets in a block 915. After that the procedure is terminated and continues to the end block 917. If there is no more space in the buffer (due to some congestion phenomenon) the current arriving data packet is instead discarded in a block 919, after which the procedure is terminated in the block 917.

I claim:

1. In a packet switch comprising an input side including an input unit for receiving data packets that are supplied to the packet switch in a sequential order; an output side including an output unit for supplying the data packets from the packet switch; and at least two identical switching planes, each coupled to receive the data packets from the input unit and to supply the data packets to the output unit, a method for supplying the data packets from the output side, comprising the steps of:

in the output unit:
receiving a data packet from one of the switching planes;
testing the received data packet to determine whether it is a next data packet that is to be supplied from the output side;
supplying the received data packet from the output side of the packet switch if the received data packet is determined to be the next data packet; and
if the received data packet is determined not to be the next data packet, then storing the received data packet in an output unit buffer that corresponds to the one of the switching planes through which the received data packet has passed,
wherein the output unit buffer has a limited size, and wherein the step of storing the received data packet in the output unit buffer comprises the steps of:
determining whether the output unit buffer is full;
if the output unit buffer is full, then discarding one data packet selected from the received data packet and a data packet already stored in the output unit buffer, the already stored data packet having a highest or latest place in sequential order compared to all other data packets that are already stored in the output unit buffer; and
if the received data packet has not been discarded, then storing it in the output unit buffer.

2. A data packet switch for transferring data packets, comprising:

an input side including an input unit for receiving data packets that arrive in a sequential order;
an output side including an output unit for supplying the data packets from the data packet switch;
at least two identical switching planes, each coupled to receive the data packets from the input unit and to supply the data packets to the output unit; and
connection establishing means, coupled to the at least two identical switching planes, for establishing a connection between the input unit and the output unit on each of the parallel switching planes,
wherein the output unit comprises:
supplying means for supplying data packets from the output unit;
at least two buffers, each for a corresponding one of the at least two identical switching planes, and each for storing at least one data packet;
first testing means for testing whether a first data packet that has been received by the output unit is a next data packet within the sequential order to be supplied from the data packet switch;
a control device, coupled to the supplying means, to the first testing means and to the buffers, and responsive to an output of the first testing means, for supplying the received first data packet from the output unit when the first data packet is the next data packet, and for storing the first data packet in a buffer that corresponds to the one of the switching planes through which the first data packet has passed,
wherein:
the output unit further comprises second testing means, coupled to the control device and to the buffers and responsive to the output of the first testing means, for testing contents of the buffers to determine whether any contains a further next data packet within the sequential order to be supplied from the data packet switch; and
the control device is responsive to an output of the second testing means for supplying the further next data packet from the output unit.

3. The data packet switch of claim 2, wherein the second testing means and the control device are responsive to a further next data packet being supplied from the output unit for repeatedly testing contents of the buffers to determine whether any contains a still further next data packet with the sequential order to be supplied from the data packet switch and supplying the still further next data packet from the output unit, until no still further next data packet is present in any of the buffers.

4. A data packet switch for transferring data packets, comprising:

an input side including an input unit for receiving data packets that arrive in a sequential order;
an output side including an output unit for supplying the data packets from the data packet switch;
at least two identical switching planes, each coupled to receive the data packets from the input unit and to supply the data packets to the output unit; and
connection establishing means, coupled to the at least two identical switching planes, for establishing a connection between the input unit and the output unit on each of the parallel switching planes,
wherein the output unit comprises:
supplying means for supplying data packets from the output unit;

at least two buffers, each for a corresponding one of the at least two identical switching planes, and each for storing at least one data packet;

first testing means for testing whether a first data packet that has been received by the output unit is a next data packet within the sequential order to be supplied from the data packet switch;

a control device, coupled to the supplying means, to the first testing means and to the buffers, and responsive to an output of the first testing means, for supplying the received first data packet from the output unit when the first data packet is the next data packet, and for storing the first data packet in a buffer that corresponds to the one of the switching planes through which the first data packet has passed, wherein:

the buffers have a limited size; and the control device further includes means, responsive to the first data packet not being the next data packet and a buffer full condition of one of the buffers that corresponds to the one of the switching planes through which the first data packet has passed, for discarding one data packet selected from the received first data packet and a data packet already stored in the corresponding one of the buffers, the already stored data packet having a latest place in sequential order compared to all other data packets that are already stored in the corresponding one of the buffers.

5. A data packet switch for transferring data packets, comprising:

an input side including an input unit for receiving data packets that arrive in a sequential order;

an output side including an output unit for supplying the data packets from the data packet switch;

at least two identical switching planes, each coupled to receive the data packets from the input unit and to supply the data packets to the output unit; and connection establishing means, coupled to the at least two identical switching planes, for establishing a connection between the input unit and the output unit on each of the parallel switching planes, wherein the output unit comprises:

supplying means for supplying data packets from the output unit;

at least two buffers, each for a corresponding one of the at least two identical switching planes, and each for storing at least one data packet;

first testing means for testing whether a first data packet that has been received by the output unit is a next data packet within the sequential order to be supplied from the data packet switch;

a control device, coupled to the supplying means, to the first testing means and to the buffers, and responsive to an output of the first testing means, for supplying the received first data packet from the output unit when the first data packet is the next data packet, and for storing the first data packet in a buffer that corresponds to the one of the switching planes through which the first data packet has passed, wherein the data packet switch further comprises:

means for establishing a plurality of logical connections from the input unit to the output unit, each data packet transferred through the switch belonging to a logical connection, and wherein:

each of the buffers in the output unit comprises a plurality of connection-related buffers, each one of the connection-related buffers corresponding to one of the plurality of logical connections; and when the received first data packet is to be stored in one of the buffers that corresponds to the one of the switching planes through which the first data packet has passed, the received first data packet is stored into that one of the connection-related buffers which corresponds to that one of the plurality of logical connections to which the received first data packet belongs.

6. In a packet switch comprising an input side including an input unit for receiving data packets that are supplied to the packet switch in a sequential order; an output side including an output unit for supplying the data packets from the switch; and at least two identical switching planes, each coupled to receive the data packets from the input unit and to supply the data packets to the output unit, an apparatus, located in the output unit, for supplying the data packets from the output side, comprising:

means for receiving a data packet from one of the switching planes;

means for testing the received data packet to determine whether it is a next data packet that is to be supplied from the output side;

means for supplying the received data packet from the output side of the packet switch if the received data packet is determined to be the next data packet;

at least two buffers, each for a corresponding one of the at least two identical switching planes, and each for storing at least one data packet; and means, responsive to an output of the testing means indicating that the received data packet is not the next data packet, for storing the received data packet in a corresponding one of the buffers that corresponds to the one of the switching planes through which the received data packet has passed, wherein:

each of the buffers has a limited size; and the means for storing the received data packet in the corresponding one of the buffers comprises:

means for determining whether the corresponding one of the buffers is full;

means, responsive to the corresponding one of the buffers being full, for discarding one data packet selected from the received data packet and a data packet already stored in the corresponding one of the buffers, the already stored data packet having a highest or latest place in sequential order compared to all other data packets that are already stored in the corresponding one of the buffers; and means, responsive to the received data packet not being discarded, for storing the received data packet in the corresponding one of the buffers.

7. In a packet switch comprising an input side including an input unit for receiving data packets that are supplied to the packet switch in a sequential order; an output side including an output unit for supplying the data packets from the switch; and at least two identical switching planes, each coupled to receive the data packets from the input unit and to supply the data packets to the output unit, an apparatus, located in the output unit, for supplying the data packets from the output side, comprising:

- means for receiving a data packet from one of the switching planes;
- means for testing the received data packet to determine whether it is a next data packet that is to be supplied from the output side;
- means for supplying the received data packet from the output side of the packet switch if the received data packet is determined to be the next data packet;
- at least two buffers, each for a corresponding one of the at least two identical switching planes, and each for storing at least one data packet; and
- means, responsive to an output of the testing means indicating that the received data packet is not the next data packet, for storing the received data packet in a corresponding one of the buffers that corresponds to the one of the switching planes through which the received data packet has passed, wherein:
  - each data packet communicated through the packet switch belongs to one of a plurality of logical connections established through the packet switch;
  - each of the buffers comprises a plurality of connection-related buffers, each of the connection-related buffers corresponding to one of the plurality of logical connections; and
  - the means for storing stores the received data packet into one of the connection-related buffers that corresponds to that one of the plurality of logical connections through which the received data packet was communicated.

* * * * *